United States Patent [19]

Schafbuch et al.

[11] Patent Number: 5,482,249
[45] Date of Patent: Jan. 9, 1996

[54] FLUID CONTROL VALVE WITH ATTENUATOR AND DYNAMIC SEAL

[75] Inventors: Paul J. Schafbuch; Charles R. Kuhlman, both of Marshalltown, Iowa

[73] Assignee: Fisher Controls International, Inc., Clayton, Mo.

[21] Appl. No.: 262,914

[22] Filed: Jun. 21, 1994

[51] Int. Cl.$^6$ .................................................. F16K 47/02
[52] U.S. Cl. ............................ 251/118; 251/174; 138/44
[58] Field of Search .................................... 251/118, 127, 251/120, 309, 314, 174; 138/44

[56] References Cited

U.S. PATENT DOCUMENTS

| | | |
|---|---|---|
| 2,698,731 | 1/1955 | Koehler et al. . |
| 2,796,230 | 6/1957 | Grove et al. . |
| 3,068,887 | 12/1962 | Grove . |
| 3,630,229 | 12/1971 | Nagel et al. ...................... 251/118 X |
| 3,834,664 | 9/1974 | Atkinson . |
| 4,085,774 | 4/1978 | Baumann . |
| 4,155,536 | 5/1979 | Saiki . |
| 4,271,866 | 6/1981 | Bey .................................... 251/127 X |
| 4,402,485 | 9/1983 | Fagerlund ............................. 251/118 |
| 4,477,055 | 10/1984 | Partridge . |
| 4,527,771 | 7/1985 | Yeary ................................... 251/118 |
| 4,575,045 | 3/1986 | Martin et al. . |
| 5,074,522 | 12/1991 | Reynolds et al. . |
| 5,180,139 | 1/1993 | Gethmann et al. . |

OTHER PUBLICATIONS

©Fisher Controls 1990, 1991, Drawing No. 42B4651, "Size 2–12, Design V300, Vee–Ball Valve Assembly".
Brochure, Grove Incorporated, "Grove Ranger", pp. 2–5.

Primary Examiner—Martin P. Schwadron
Assistant Examiner—Kevin L. Lee
Attorney, Agent, or Firm—Marshall, O'Toole, Gerstein, Murray & Borun

[57] ABSTRACT

A dynamic seal is provided between a rotatable ball control member and a noise attenuator in a fluid control valve. In one embodiment a noise attenuator is rigidly clamped in the valve body and a floating, spring biased seal is provided in the attenuator and facing the ball. A bi-directional fluid control valve is provided with two rigidly mounted noise attenuators each having a floating, spring biased ball seal. In a second embodiment a noise attenuator is floating, spring biased towards the ball and includes an annular seal retained in the attenuator. Pressure balancing the fluid flow pressure and the spring bias enables substantially zero seal engagement with the ball during ball rotation, while enabling a reliable seal of the ball in the shut-off valve position.

15 Claims, 4 Drawing Sheets

5,482,249

FLUID CONTROL VALVE WITH ATTENUATOR AND DYNAMIC SEAL

This invention relates to fluid control valves and more particularly to such valves with noise attenuators.

BACKGROUND OF THE INVENTION

Fluid control valves are often utilized in precisely controlling the amount of fluid applied to a system in response to valve controllers and actuators. The precise control of fluid is desired in such systems to control the delivery of a precise amount of fluid, or in order to conserve the application and use of fluid additives which may be extremely dangerous or highly expensive. The control valve also must provide a reliable sealing shut-off of the fluid flow when the valve is placed in the shut-off position to prevent the undesired loss of fluid through leakage. Often times a noise attenuator must be used in the pipeline system of either single stage or multi-stage attenuation capability so as to reduce the aerodynamic and hydrodynamic noise within the system, and it is desirable to include the noise attenuator within the fluid control valve.

Typically, such fluid control valves utilize a rotating ball control member mounted in a valve body passageway and with suitable sealing provided between the ball and the valve body. Normally, in a shut-off position of the ball control member the ball blocks the flow of fluid through the valve body passageway from an inlet to an outlet by virtue of the ball sealingly engaging a sealing member. The fluid flow is thus stopped by the ball control member and the reliable seal prevents the fluid from otherwise passing between the rotating ball control member and the valve body and undesirably leaking into the valve outlet.

In a typical fluid control member, the ball control member is rotated to the open position in the valve body passageway to enable fluid flow to pass from the valve inlet through the ball and to the valve outlet. However, in providing sufficient loading of the seal against the ball to assure a reliable seal during valve shut-off, this condition leads to a high degree of friction between the ball and the seal during ball rotation for controlling fluid flow. Thus, the high degree of friction resulting from the loading required to obtain a reliable seal during valve shut-off significantly impairs the ability to precisely position the ball control member which in turn determines the exact fluid flow which is desired in many instances. An added problem is the need to provide a noise attenuator mounted within the fluid control valve structure.

It is therefore desired to provide a fluid control valve including a noise attenuator and where there is provided a reliable valve shut-off seal condition. Furthermore, it is desired to provide such a fluid control valve and attenuator combination which can provide a much lower friction between the ball and the seal during valve operation so that precise control of the fluid flow can be obtained.

SUMMARY OF THE INVENTION

In accordance with the principles of the present invention, there is provided a fluid control valve having a noise attenuator with spring means coupled to an annular seal of a ball control member to provide a reliable shut-off sealing condition. A rotary fluid control valve according to another aspect of the invention also provides pressure biased seal means including a spring coupled to the annular seal for urging the annular seal in reduced frictional engagement between the seal and the ball control member during valve operation while still providing a reliable seal during shut-off.

In a first embodiment of the invention, there is provided a rotary fluid control valve and flow attenuator combination which includes a valve body having a first port, a second port, and an interconnecting passageway. A rotating ball control member is rotatably mounted within the passageway to control the flow of fluid, and an attenuator having a plurality of apertures is rigidly mounted in the passageway adjacent the rotating ball. A floating seal including an annular seal member and spring means coupled to the annular seal are mounted in the attenuator and in contact with the rotating ball so as to urge the annular seal into engagement with the ball in the valve shut-off position.

This rigid attenuator and floating seal is particularly useful in a bi-directional fluid control valve wherein there may also be provided a second attenuator rigidly mounted on the opposite side of the ball along with a respective annular seal and spring means floatingly mounted between the attenuator and the ball as in the first described attenuator and floating seal. This configuration of the invention is particularly useful in the bi-directional aspect of the invention so that a rotary fluid control valve having the previously described two rigidly mounted attenuators and floating seals on opposite sides of the ball control member can be utilized in either flow direction.

In accordance with a second aspect of the present invention, an attenuator having a plurality of apertures is floatably mounted within the valve body passageway and the attenuator includes an annular seal mounted in the attenuator in contact with the rotating ball. A spring is mounted between the valve body and the attenuator. During the valve open position, the pressure drop across the attenuator due to the fluid flow biases the seal away from the ball surface so as to decrease seal friction and wear and enable a precise control of the rotating ball member to be attained. During valve shut-off, the pressure drop across the attenuator is reduced so that the spring can overcome the remaining pressure difference and bias the seal into contact with the ball surface.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

DETAILED DESCRIPTION

Figure 1:
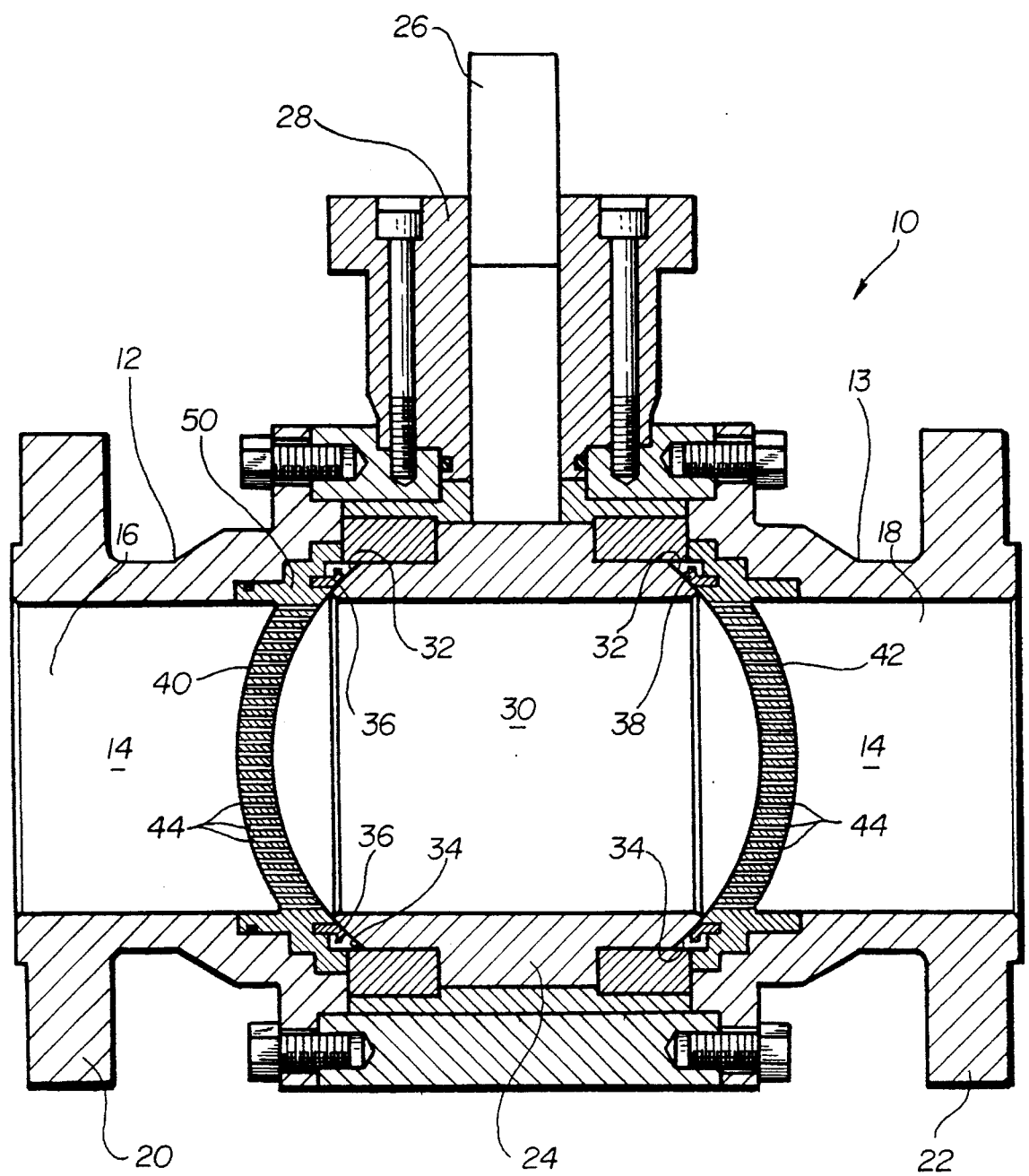
FIG. 1 is a schematic sectional view of a fluid control valve in accordance with the principles of the present invention.
Figure 2:
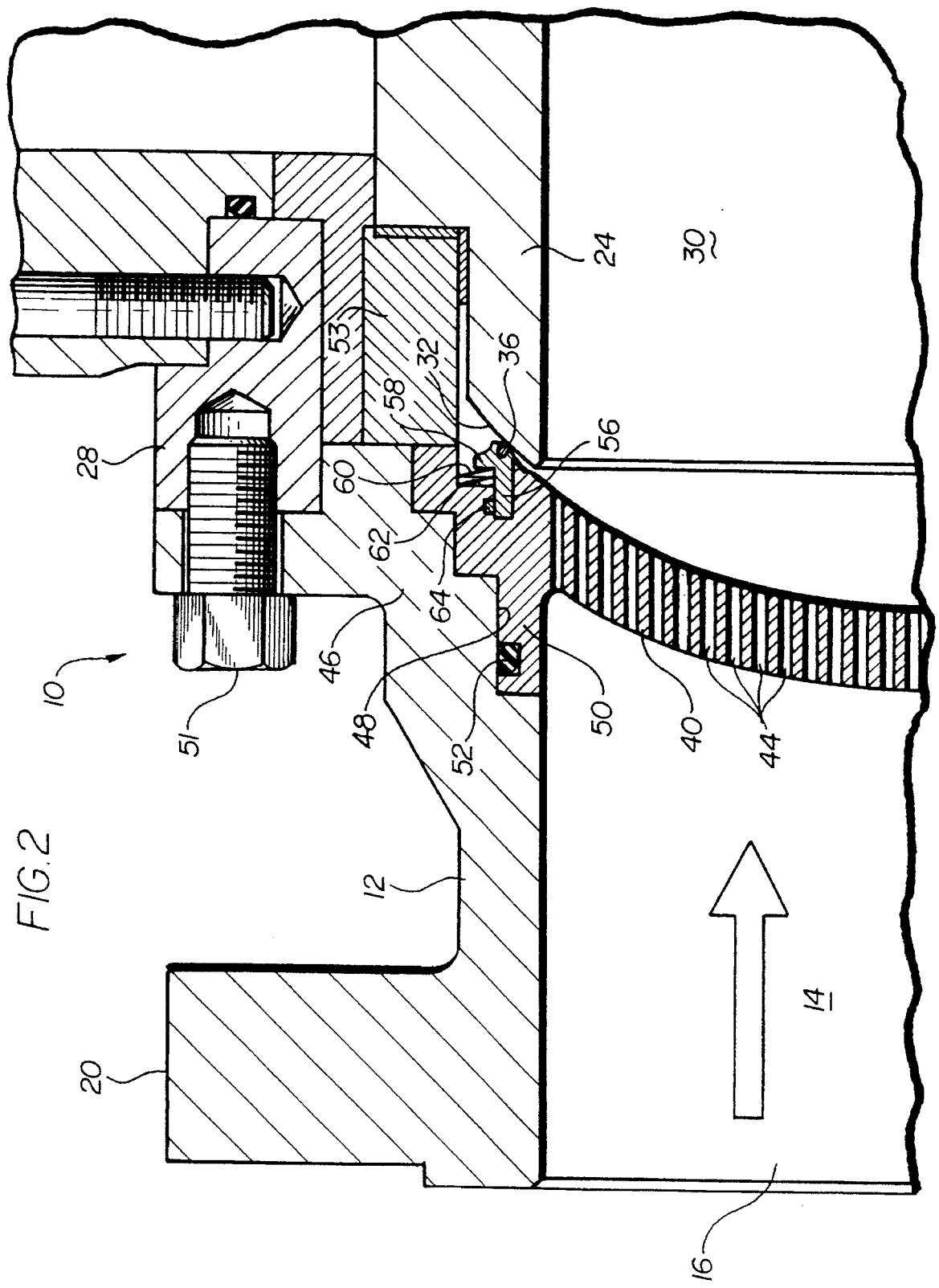
FIG. 2 is a fragmented sectional view of the fluid control valve of FIG. 1 illustrating a dynamic sealing of the ball control member.
Figure 3:
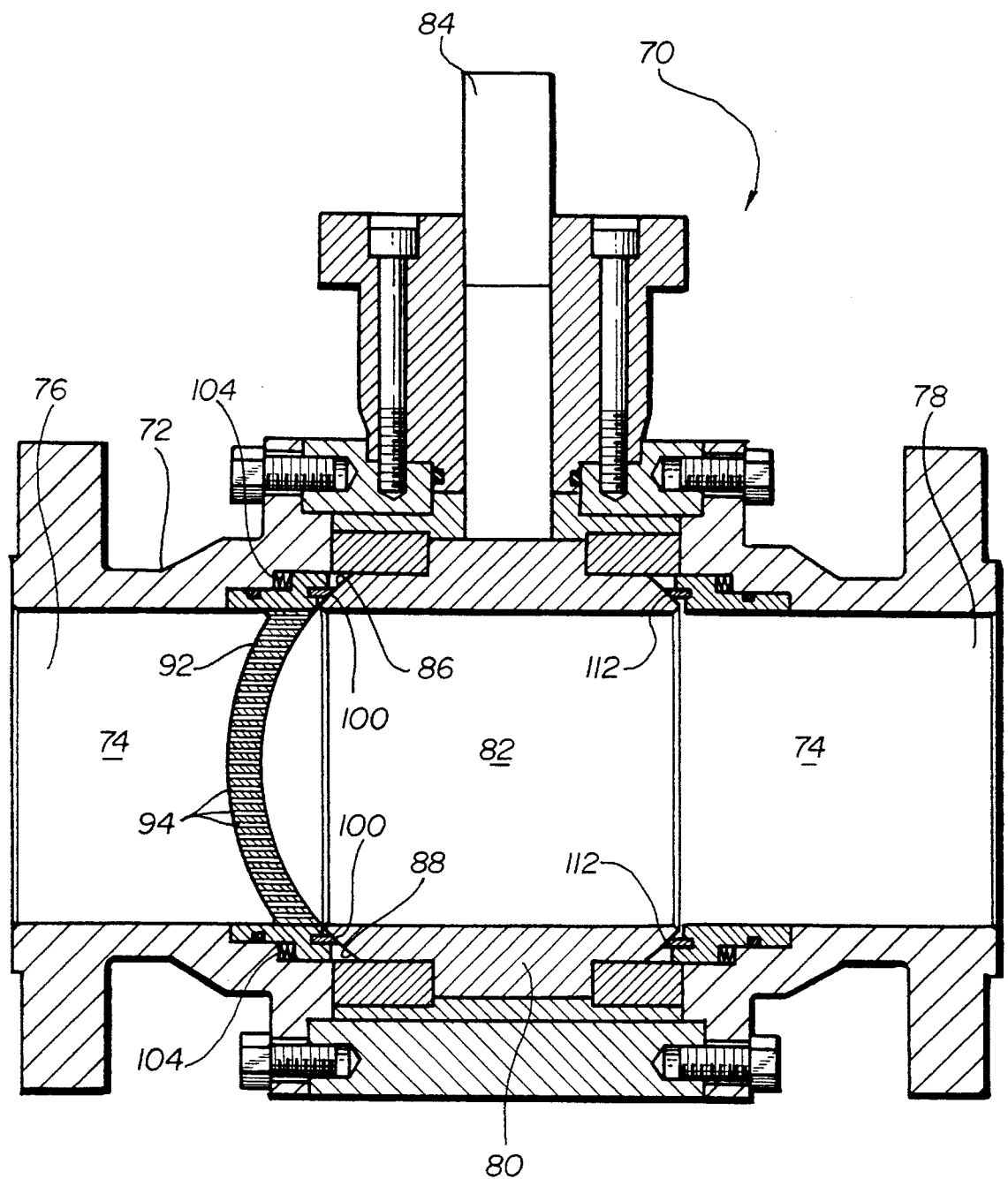
FIG. 3 is a schematic diagram of a fluid control member illustrating a second embodiment of the present invention.
Figure 4:
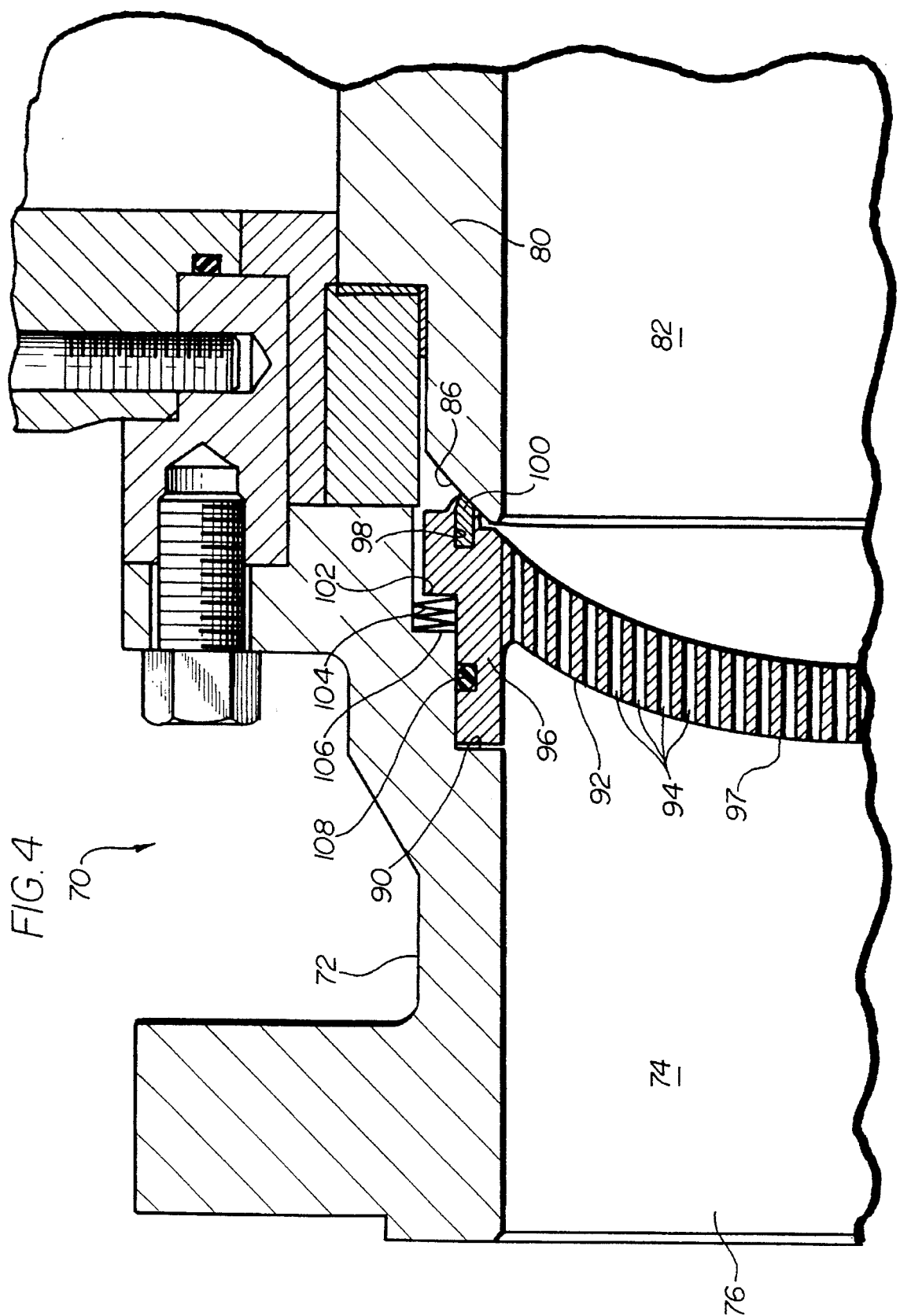
FIG. 4 is a fragmentary sectional view of a portion of the fluid control valve of FIG. 3 illustrating an alternative dynamic sealing mechanism for the ball control member.

In accordance with the principles of the present invention, there is provided a dynamic sealing configuration for a ball control member of a rotary fluid control valve which includes a noise attenuator device. FIG. 1 illustrates a configuration with two attenuators. FIG. 2 illustrates a dynamic seal mechanism for a fluid control valve which is particularly useful for bi-directional fluid flow usage. FIGS. 3 and 4 illustrate an alternative dynamic sealing configuration in a uni-directional fluid control valve which features a pressure biased seal condition providing substantially no friction with the ball during flow control, while enabling a reliable sealing engagement with the ball during valve shut-off.

A fluid control valve 10 includes valve body end pieces 12 and 13 with a passageway 14 for coupling fluid in either direction between a first valve port 16 and a second valve port 18. Respective mounting flanges 20, 22 are provided for mounting the control valve 10 within a pipeline system. A rotatable ball control member 24 includes a rotatable shaft 26 which in turn is mounted within a valve body 28. The ball control member 24 includes a channel 30 extending through the ball control member 24 between opposite surfaces 32, 34.

In the valve open position shown in FIG. 1, the shaft 26 has been rotated so as to place the channel 30 in fluid communication with the passageway 14 so that the flow of fluid can be controlled between the first port 16 and the second port 18 or vice versa. It is understood, of course that the amount of fluid flow is controlled by rotation of the shaft 26 by means of a valve actuator and positioner/controller configuration in accordance with standard practice.

Often times, very precise control of the amount of fluid passing through the control valve 10 must be provided. Fluid flow is shut-off by rotating the shaft 26 so that the channel 30 is no longer fluid coupled to the passageway 14. In the valve shut-off position, it is desired that the ball surfaces 32, 34 are securely engaged with respective annular seals 36, 38 so that the fluid flow is reliably shut-off and thereby preventing the leakage and escape or loss of dangerous or expensive fluid being controlled by the valve 10.

Within the fluid control valve 10, there is mounted respective noise attenuators 40, 42 provided for attenuating the aerodynamic and hydrodynamic noise in the pipeline system. Each of the noise attenuators 40, 42 is dome-shaped and includes a plurality of apertures 44 forming fluid passageways through the dome-shaped noise attenuators.

Referring now to FIG. 2, there is illustrated a preferred embodiment of the invention in providing a noise attenuator within the bi-directional control valve 10 while also providing the desired ability to precisely control the flow of fluid in the valve open position while also enabling a reliable shut-off of the fluid in the valve shut-off position. The valve body end piece 12 includes a body flange portion 46 which has a stepped cavity section 48.

The attenuator dome 40 has a perimeter 50 with an outer profile in stepped fashion to match the stepped cavity 48 as shown in FIG. 2. An O-ring or static seal 52 is securely nested within a suitable annular depression in the perimeter 50. The noise attenuator dome 40 is installed in the valve body end piece 12 by inserting the perimeter 50 within the stepped cavity 48 and clamping the two pieces together by means of a threaded bolt 51 threadably inserted into the valve body flange 46 and mounted into the valve body 28. This forces a bearing plate 53 securely against the flange portion 46 to rigidly maintain the noise attenuator 40 between the valve body 28 and body end piece 12.

Sealing of the ball control member 24 is provided by a floating seal configuration floatingly mounted within the attenuator and which includes the seal member 36 dynamically engaging the ball surface 32 of the ball 24. Seal member 36 is an annular seal member insertably mounted within an annular seal holder 56 which includes a shoulder 58. The seal holder 56 is sized with respect to an annular cavity in the attenuator dome perimeter 50 so it can slidably move within the cavity.

A spring 60 is trapped between the shoulder 58 on the seal holder 56 and a stop wall 62 of the attenuator dome perimeter 50. The spring 60 can be an annular wave spring, and the seal member 36 can be formed of nylon, tetrafluoroethylene, or other elastomer or suitable metal material.

As shown in FIG. 2, the spring 60 on the seal holder 56 biases the seal 36 against the ball spring 60 is adjusted in size and spring force to enable a minimum of friction between the sealing member 36 and the ball surface 32. This provides the desired precise control operation during normal fluid flow. When the valve 10 is placed in the shut-off position where the channel 30 no longer communicates with the valve body passageway 14, the pressure of the blocked fluid flow in the passageway 14 acts on the seal holder 56 so as to cause the seal member 36 to securely engage the ball surface 32 and provide a reliable shut-off condition. The diameters of the sealing member 36 and of the seal means 64 are adjusted so the pressure of this blocked fluid generates the optimal amount of this pressure bias force. With the valve 10 in the open position, the pressures acting on the seal holder 56 are equal, the pressure bias force is thus eliminated, and hence the only remaining seal friction is due to spring bias. If desired, an O-ring or static seal 64 may be used to prevent fluid leakage around the seal holder 56.

The dynamic seal of FIG. 2 can be used in a dual seal configuration as in FIG. 1 and may also be used with fluid bleeding to verify dual seal integrity as in a double block and bleed configuration. The dynamic seal of FIG. 2 also can be used as a single stage attenuator/seal in a fluid control valve.

Reference may now be made to FIGS. 3 and 4, wherein there is illustrated a fluid control valve 70 containing a floating dome seal particularly adaptable for uni-directional flow of fluid and which provides zero or a very small amount of friction with the ball during ball rotation while providing a much more secure sealing engagement during valve shut-off.

The fluid control valve 70 includes a valve body 72 having a passageway 74 for communicating fluid between an input port 76 and an output port 78. A ball control member 80 includes a channel bore 82 and a rotary shaft 84 for placing the valve in an open position with the channel 82 communicating with the passageway 74 or in a shut-off position where the channel 82 no longer communicates with the passageway 74 and the ball surfaces 86, 88 securely engage respective seals in the valve body.

As can be seen from FIG. 4, in this alternative configuration, the seal mechanism includes seal material embedded in the dynamically biased and floating attenuator structure instead of the rigidly clamped attenuator and dynamically biased seal 36 in the seal holder 56 as previously described in connection with FIG. 2.

In FIG. 4, the valve body 72 includes a stepped cavity portion 90 at the downstream side of the valve, within which there is mounted a floatably mounted noise attenuator 92 having a series of apertures 94. A perimeter portion 96 of the attenuator 92 includes an annular groove 98 within which is mounted an annular seal member 100. An outer shoulder 102 is provided on the attenuator perimeter 96 so as to accommodate an annular wave spring 104 mounted between the shoulder 102 and a flange stop wall 106 of the valve body. An O-ring or static seal 108 prevents fluid leakage between the perimeter portion 96 of the attenuator 92 and the valve body 72. The seal 108 diameter is sized relative to the seal member 100 diameter to provide a pressure bias force to aid seal integrity when used in a double block and bleed configuration as shown in FIG. 3. If desired, a gap seal member formed of an annular resilient sealing material can be utilized to prevent debris from collecting in the seal mechanism cavity and to prevent possible tone generation which would be an undesired noise source. A standard spring loaded ball seal 112 is mounted at the upstream side of the valve if double block and bleed sealing is desired.

Referring to FIG. 4, it can be seen that when this embodiment of the invention is used as an outlet seal/attenuator stage at the downstream side of the valve, the fluid flow in the indicated direction will provide a pressure drop across the attenuator 92 to bias the seal member 100 away from the ball surface 86 when the valve is opened, thereby decreasing the seal friction and wear. It is desired that the pressure drop should equal or be slightly greater than the spring force to ensure that there is no engagement of seal 100 with the ball. This provides precise fluid control to be attained.

When the ball is closed and the channel 82 is no longer communicating with the passageway 74, the pressure drop across the attenuator is reduced to essentially zero so that the spring 104 overcomes the remaining pressure unbalance force due to difference between diameters of seal member 100 and seal 108 and biases the seal member 100 into contact with the ball surface 86.

Therefore, in accordance with the principles of the present invention, there has been provided a very reliable dynamic seal configuration for fluid control valves useful for either desired uni-directional or bi-directional flow and uni-directional or double block and bleed sealing.

The fluid control valves with attenuators described herein can be used to control various fluids, including liquids and gases. Attenuator hole diameters of about 0.125 inch (0.318 cm) have been used in prototypes. For gases the holes through the attenuator would be of small diameter. For liquids the holes may be of special shape to improve anti-cavitation performance. Also, rather than the dome-shaped attenuators, other shapes such as flat could be used for the surface 97 opposite the ball. Furthermore, it is desired that the same valve body is used for both of the embodiments shown in FIGS. 2 and 4 so as to minimize manufacturing costs and inventory requirements and lead to greater product flexibility.

The foregoing detailed description has been given for clearness of understanding only, and no unnecessary limitations should be understood therefrom, as modifications will be obvious to those skilled in the art.

We claim:

1. A rotary fluid control valve and noise attenuator combination for providing reliable fluid flow shut-off in a pipeline system, the combination comprising:
   a valve body having a first port, a second port, and an interconnecting passageway;
   a ball rigidly mounted in said valve body and rotatable within said passageway from a valve shut-off position to a valve open position for controlling the flow of fluid through said passageway;
   an attenuator floatably mounted in said passageway adjacent said ball, said attenuator including a plurality of apertures for reducing the noise within the pipeline system;
   an annular seal mounted in said attenuator so as to contact said ball; and
   spring means coupled to said annular seal for urging said annular seal into engagement with said ball in the valve shut-off position.

2. A rotary fluid control valve and noise attenuator combination according to claim 1 including,
   a second annular seal mounted in the passageway and contacting said ball on a side opposite from said first annular seal; and
   second spring means coupled to said second annular seal for urging said second annular seal into engagement with said ball in the valve shut-off position.

3. A rotary fluid control valve and noise attenuator combination according to claim 1, wherein said attenuator includes a perimeter portion with said annular seal retained in said perimeter portion.

4. A rotary fluid control valve and noise attenuator combination according to claim 3, wherein said spring means is mounted between said attenuator perimeter portion and said valve body for biasing the annular seal towards the ball.

5. A rotary fluid control valve and noise attenuator combination according to claim 4, wherein said fluid flow enables a pressure difference across said attenuator to overcome said bias and substantially disengage the annular seal from said ball.

6. A rotary fluid control valve and noise attenuator combination for providing reliable fluid flow shut-off in a pipeline system, the combination comprising:
   a valve body having a first port, a second port, and an interconnecting passageway;
   a ball rigidly mounted in said valve body and rotatable within said passageway from a valve shut-off position to a valve open position for controlling the flow of fluid through said passageway;
   an attenuator mounted in said passageway adjacent said ball, said attenuator including a plurality of apertures for reducing the noise within the pipeline system;
   an annular seal mounted in said attenuator so as to contact said ball;
   spring means coupled to said annular seal for urging said annular seal into engagement with said ball in the valve shut-off position; and
   a second attenuator mounted in said passageway adjacent said ball and on the opposite side from said first attenuator, said second attenuator including a plurality of apertures for reducing the noise within the pipeline system.

7. A rotary fluid control valve and noise attenuator combination according to claim 6, for providing a bi-directional fluid control valve, including,
   a second annular seal mounted between said second attenuator and said ball; and
   second spring means coupled to said second annular seal for urging said second annular seal into engagement with said ball in the valve shut-off position.

8. A rotary fluid control valve and noise attenuator combination for providing reliable fluid flow shut-off in a pipeline system, the combination comprising:
   a valve body having a first port, a second port, and an interconnecting passageway;
   a ball rigidly mounted in said valve body and rotatable within said passageway from a valve shut-off position to a valve open position for controlling the flow of fluid through said passageway;
   an attenuator mounted in said passageway adjacent said ball, said attenuator including a plurality of apertures for reducing the noise within the pipeline system;
   an annular seal mounted in said attenuator so as to contact said ball;

spring means coupled to said annular seal for urging said annular seal into engagement with said ball in the valve shut-off position;

said attenuator rigidly mounted in said passageway and including a perimeter portion with an annular cavity facing said ball and adapted for receiving said spring means; and an annular seal holder slidably mounted within said annular cavity, said annular seal holder including means for retaining said annular seal.

9. A rotary fluid control valve and noise attenuator combination according to claim 8, wherein said annular seal holder includes a shoulder for trapping said spring in said annular cavity and biasing said annual seal holder and annular seal towards said ball.

10. A rotary fluid control valve and noise attenuator combination providing reliable fluid flow shut-off and low friction during rotary control of the fluid flow in a pipeline system, the combination comprising:

a valve body having a fluid inlet, a fluid outlet, and an interconnecting passageway;

a ball rigidly mounted in said valve body and rotatable within said passageway from a valve shut-off position to a valve open position for controlling the flow of fluid from said fluid inlet to said fluid outlet;

an attenuator mounted in said passageway adjacent said ball, said attenuator including a plurality of apertures for reducing the noise within the pipeline system;

an annular seal mounted between said attenuator and said ball; and pressure biased seal means including fluid pressure means and spring means coupled to said annular seal, said pressure biased seal means (1) urging said annular seal in firm sealing engagement with said ball in the valve shut-off position, while (2) substantially only said spring means urging said annular seal in engagement with said ball in the valve open position so as to provide low friction between said annular seal and said ball during rotary control of the fluid flow.

11. A rotary fluid control valve and flow attenuator according to claim 10, wherein said attenuator is floatably mounted in said passageway.

12. A rotary fluid control valve and noise attenuator according to claim 11, wherein said attenuator includes a perimeter portion with said annular seal retained in said perimeter portion.

13. A rotary fluid control valve and noise attenuator according to claim 12, wherein said spring means is mounted between said attenuator perimeter portion and said valve body for biasing the annular seal towards the ball.

14. A rotary fluid control valve and noise attenuator according to claim 13, wherein said fluid flow enables a pressure difference across said attenuator to overcome said bias and substantially disengage the annular seal from said ball.

15. A rotary fluid control valve and noise attenuator according to claim 10, including, a second annular seal mounted in the passageway and contacting said ball on a side opposite from said first annular seal; and second spring means coupled to said second annular seal for urging said second annular seal into engagement with said ball in the valve shut-off position.

* * * * *

UNITED STATES PATENT AND TRADEMARK OFFICE
CERTIFICATE OF CORRECTION

PATENT NO. : 5,482,249
DATED : January 9, 1996
INVENTOR(S) : PAUL J. SCHAFBUCH, ET AL.

It is certified that error appears in the above-identified patent and that said Letters Patent is hereby corrected as shown below:

Col. 4, line 10            after "ball" insert --surface 32 in accordance with the invention. The--.

Signed and Sealed this

Twenty-fifth Day of March, 1997

Attest:

BRUCE LEHMAN

*Attesting Officer*      *Commissioner of Patents and Trademarks*